US011237241B2

(12) United States Patent
Watt et al.

(10) Patent No.: US 11,237,241 B2
(45) Date of Patent: Feb. 1, 2022

(54) MICROPHONE ARRAY FOR SOUND SOURCE DETECTION AND LOCATION

(71) Applicant: UATC, LLC, San Francisco, CA (US)

(72) Inventors: Owen Watt, Pittsburgh, PA (US); Ashutosh Ghosh, Pittsburgh, PA (US); Chao Zhang, Pittsburgh, PA (US); Jacob Daniel Fetter, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 16/710,262

(22) Filed: Dec. 11, 2019

(65) Prior Publication Data

US 2021/0109187 A1    Apr. 15, 2021

Related U.S. Application Data

(60) Provisional application No. 62/913,429, filed on Oct. 10, 2019.

(51) Int. Cl.
| | |
|---|---|
| *G01S 3/805* | (2006.01) |
| *H04R 3/00* | (2006.01) |
| *G08G 1/0965* | (2006.01) |
| *H04R 1/40* | (2006.01) |
| *G10L 21/0216* | (2013.01) |

(52) U.S. Cl.
CPC .......... *G01S 3/8055* (2013.01); *G08G 1/0965* (2013.01); *H04R 1/406* (2013.01); *H04R 3/005* (2013.01); *G10L 2021/02166* (2013.01); *H04R 2499/13* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,530,426 B1 * | 12/2016 | Wright | .................. | H04M 3/568 |
| 10,055,192 B1 * | 8/2018 | Shau | .................. | H04M 1/72454 |
| 10,785,566 B2 * | 9/2020 | Geng | ........................ | H04R 5/04 |
| 2004/0223623 A1 * | 11/2004 | Lo | ........................... | H04R 3/005 381/92 |
| 2017/0048634 A1 * | 2/2017 | Muza | ................... | H04R 29/004 |
| 2017/0120804 A1 * | 5/2017 | Kentley | ................ | B60W 30/08 |

(Continued)

*Primary Examiner* — Duc Nguyen
*Assistant Examiner* — Assad Mohammed
(74) *Attorney, Agent, or Firm* — Dority & Manning, P.A.

(57) ABSTRACT

Systems, methods, tangible non-transitory computer-readable media, and devices associated with detecting and locating sounds are provided. For example, sound data associated with sounds can be received. The sounds can include source sounds and background sounds received by microphones. Based on the sound data, time differences can be determined. Each of the time differences can include a time difference between receipt of a source sound and receipt of a background sound at each of the microphones respectively. A set of the source sounds can be synchronized based on the time differences. An amplified source sound can be generated based on a combination of the synchronized set of the source sounds. A source location of the source sounds can be determined based on the amplified source sound. Based on the source location, control signals can be generated in order to change actions performed by an autonomous vehicle.

20 Claims, 8 Drawing Sheets

(56) References Cited

U.S. PATENT DOCUMENTS

| | | | |
|---|---|---|---|
| 2017/0219686 A1* | 8/2017 | Xie ......................... | H04R 1/04 |
| 2018/0211528 A1* | 7/2018 | Seifert .............. | B60W 60/0015 |
| 2019/0147610 A1* | 5/2019 | Frossard .................. | G06T 7/90 |
| | | | 382/103 |
| 2019/0283758 A1* | 9/2019 | Arisa .................... | B60W 10/18 |
| 2020/0031337 A1* | 1/2020 | Soltanian .......... | B60W 30/0956 |

* cited by examiner

AUDIO COMPUTING SYSTEM 700

ONE OR MORE DATA ACCESSING UNITS 702

ONE OR MORE TIMING UNITS 704

ONE OR MORE SYNCHRONIZATION UNITS 706

ONE OR MORE AMPLIFICATION UNITS 708

ONE OR MORE SOURCE LOCATION UNITS 710

ONE OR MORE CALIBRATION UNITS 712

ONE OR MORE FILTERING UNITS 714

ONE OR MORE CONTROL UNITS 716

FIG. 7

MICROPHONE ARRAY FOR SOUND SOURCE DETECTION AND LOCATION

RELATED APPLICATION

The present application is based on and claims benefit of U.S. Provisional Patent Application No. 62/913,429 having a filing date of Oct. 10, 2019, which is incorporated by reference herein.

FIELD

The present disclosure relates generally to the use of a microphone array to detect and locate the source of sounds in an environment.

BACKGROUND

Vehicles, including autonomous vehicles, can receive data that is used to determine the state of an environment through which the vehicle travels. This data can be associated with various representations of the environment including sounds that are present in the environment. As the state of the environment is dynamic, and the sounds that are present in the environment can change over time, operation of a vehicle may rely on an accurate determination of the state of the representations of the environment over time.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of detecting and locating sounds in an environment. The computer-implemented method can include receiving, by a computing system including one or more computing devices, sound data associated with one or more sounds. The one or more sounds can include source sounds and background sounds received by each of a plurality of microphones. The computer-implemented method can include determining, by the computing system, based at least in part on the sound data, a plurality of time differences. Each of the plurality of time differences can include a time difference between receipt of a source sound and receipt of a background sound at each of the plurality of microphones respectively. Further, the computer-implemented method can include synchronizing, by the computing system, a set of the source sounds based at least in part on the plurality of time differences. The computer-implemented method can include generating, by the computing system, an amplified source sound based at least in part on a combination of the synchronized set of the source sounds. The computer-implemented method can include determining, by the computing system, a source location of the source sounds based at least in part on the amplified source sound. Furthermore, the computer-implemented method can include generating, by the computing system and based at least in part on the source location, one or more control signals to change one or more actions performed by an autonomous vehicle.

Another example aspect of the present disclosure is directed to a computing system including: one or more processors; a memory including one or more computer-readable media, the memory storing computer-readable instructions that when executed by the one or more processors cause the one or more processors to perform operations. The operations can include receiving sound data associated with one or more sounds. The one or more sounds can include source sounds and background sounds received by each of a plurality of microphones. The operations can include determining, based at least in part on the sound data, a plurality of time differences. Each of the plurality of time differences can include a time difference between receipt of a source sound and receipt of a background sound at each of the plurality of microphones respectively. The operations can include synchronizing a set of the source sounds based at least in part on the plurality of time differences. Further, the operations can include generating an amplified source sound based at least in part on a combination of the synchronized set of the source sounds. The operations can include determining a source location of the source sounds based at least in part on the amplified source sound. Furthermore, the operations can include generating, based at least in part on the source location, one or more control signals to change one or more actions performed by an autonomous vehicle.

Another example aspect of the present disclosure is directed to an autonomous vehicle including: one or more processors; a memory including one or more computer-readable media, the memory storing computer-readable instructions that when executed by the one or more processors cause the one or more processors to perform operations. The operations can include receiving sound data associated with one or more sounds. The one or more sounds can include source sounds and background sounds received by each of a plurality of microphones. The operations can include determining, based at least in part on the sound data, a plurality of time differences. Each of the plurality of time differences can include a time difference between receipt of a source sound and receipt of a background sound at each of the plurality of microphones respectively. The operations can include synchronizing a set of the source sounds based at least in part on the plurality of time differences. Further, the operations can include generating an amplified source sound based at least in part on a combination of the synchronized set of the source sounds. The operations can include determining a source location of the source sounds based at least in part on the amplified source sound. Furthermore, the operations can include generating, based at least in part on the source location, one or more control signals to change one or more actions performed by an autonomous vehicle.

Other example aspects of the present disclosure are directed to other systems, methods, vehicles, apparatuses, tangible non-transitory computer-readable media, and devices for detecting and locating sounds in an environment.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 7 depicts a diagram of an example system according to example embodiments of the present disclosure.

DETAILED DESCRIPTION

Figure 1:
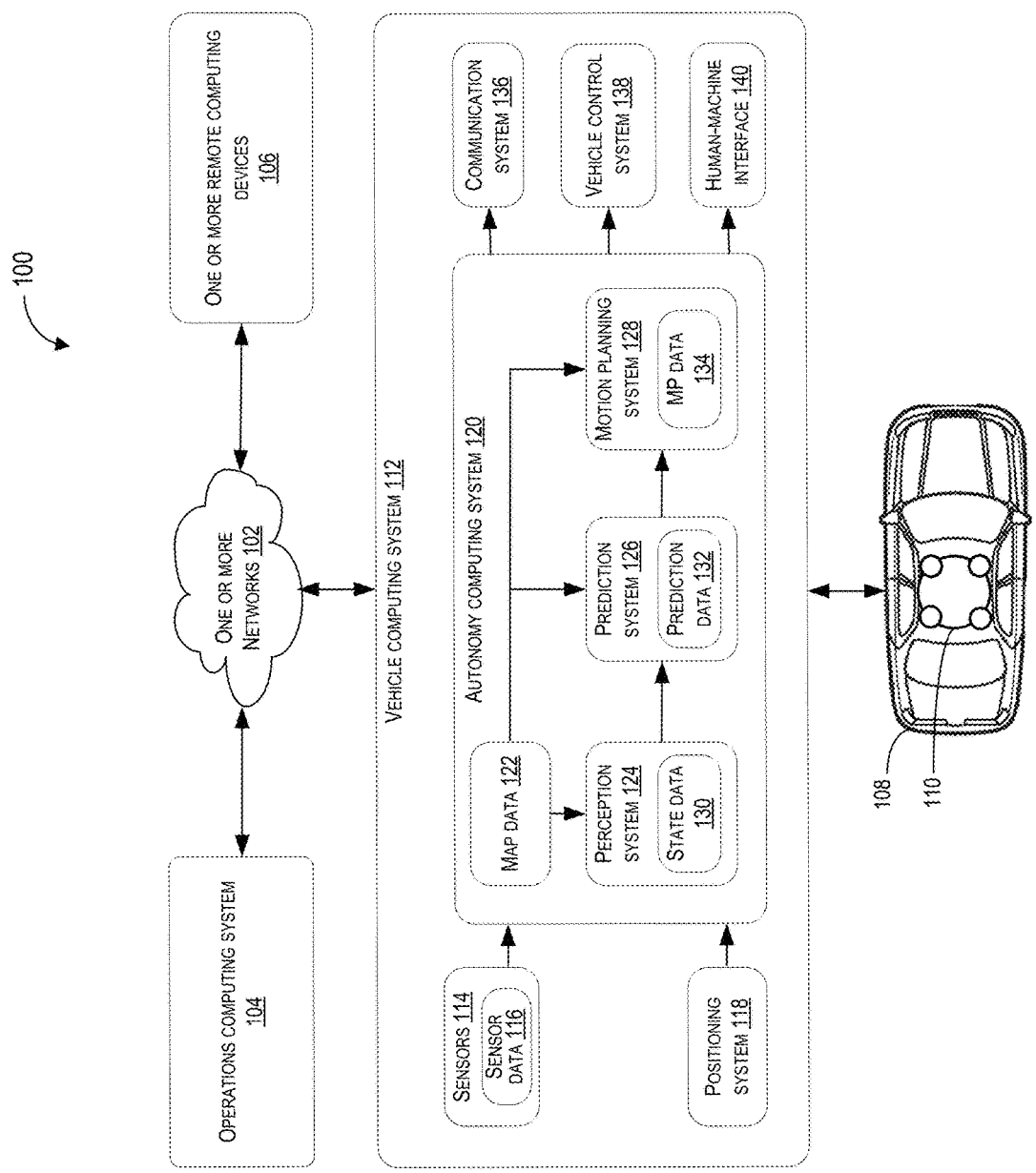
FIG. 1 depicts a diagram of an example system according to example embodiments of the present disclosure.

Example aspects of the present disclosure are directed to use of a microphone array for the detection and location of specific types of sound in an environment. For example, the disclosed technology can be used to detect and locate emergency signal sounds that are produced by emergency vehicles (e.g., ambulances, police vehicles, and fire engines) in proximity to a microphone array mounted on a vehicle such as, for example, an autonomous vehicle.

In particular, the disclosed technology can use the timing of sounds received at different microphones of a microphone array to detect and synchronize the sounds associated with a designated sound source (e.g., the sound of an ambulance siren). The synchronized sounds can then be used to create an amplified sound that can in turn be used to more accurately determine the type of sound that was produced (e.g., distinguishing an ambulance siren from another type of siren) and locate the source of the sound. As a result, the disclosed technology can improve the overall effectiveness with which certain sounds in an environment are detected and located.

The disclosed technology can be implemented by a variety of systems associated with the detection and location of sound sources in an environment. In particular, the disclosed technology can be used as part of a vehicle (e.g., an autonomous vehicle) that more accurately detects and locates certain sounds and in turn initiates an appropriate response based on the type and location of the sound that is detected. For example, an autonomous vehicle that accurately detects an approaching fire engine can pull to the side of the road to allow the fire engine to pass. In contrast, when the autonomous vehicle detects a fire engine that is moving further away, the autonomous vehicle can continue along its planned course without inconveniencing passengers and other vehicles.

Furthermore, the disclosed technology can include a computing system (e.g., an audio computing system) that is configured to perform various operations associated with the detection and location of sounds in an environment. In some embodiments, the audio computing system can be associated with the autonomy system of an autonomous vehicle which can include a perception system, a prediction system, and/or a motion planning system. Furthermore, the audio computing system can process, generate, modify, and/or access (e.g., send, and/or receive) data and/or information including data and/or information associated with sound data related to detected sounds and/or control of the autonomy system of the autonomous vehicle. By way of example, in a noisy environment filled with a multitude of sounds ranging from the sound of vehicle engines to the sound of music, the audio computing system can use sound data based on sound detected by an array of microphones to determine the type and location of certain classes of sounds (e.g., emergency signal sounds). The audio computing system can then generate control signals that are used to control the vehicle (e.g., its sensors, autonomy system, motion control systems) so that the vehicle can perform actions including stopping or pulling over when an approaching emergency signal sound is detected.

By way of further example, the audio computing system can access various data including sound data associated with an array of microphones that detect source sounds (e.g., ambulance sirens) and background sounds (e.g., ambient noise including crowd sounds, music, and the sound of vehicles). Differences in the timing of the source sounds and the backgrounds can be determined and using those differences, the source sounds can be synchronized, and an amplified source sound can be generated using the synchronized source sounds. Using the amplified source sound, the audio computing system can triangulate the source of the source sound and then generate control signals to assist with the control a vehicle. Accordingly, the disclosed technology can increase in the accuracy and precision with which the source of a sound can be detected and located. This increase in accuracy and precision can allow for a host of improvements in the operation of a vehicle or other systems that can benefit from the use of detected sounds.

The audio computing system can access sound data. Accessing the sound data can include sending and/or receiving one or more signals, data, and/or information to or from a plurality of microphones and/or computing systems associated with the plurality of microphones. The sound data can be associated with one or more sounds that can include source sounds and/or background sounds received by each of a plurality of microphones.

The source sounds can include sounds that are associated with one or more sounds that are determined to be useful and/or significant to the audio computing system. The background sounds can include noise and/or any other sound not determined to be useful and/or significant to the audio computing system. For example, the source sounds can include the sound of sirens and sharp utterances (e.g., "Stop!"), and the background sounds can include the sound of heavy machinery being operated, regular conversation, and/or the sound of music being played from an adjacent vehicle or audio device. By way of further examples, the background sounds can include the sound of devices (e.g., spinning LiDAR devices, vehicle motor sounds, and/or spinning fans including cooling fans) operated near the plurality of microphones.

The plurality of microphones can include various combinations of microphones including microphones of the same type or different types of microphones. The plurality of microphones can include one or more condenser microphones, one or more ribbon microphones, one or more dynamic microphones, micro-electrical mechanical system (MEMS) microphone, and/or one or more piezoelectric microphones. In some embodiments, any of the plurality of microphones can be omnidirectional, unidirectional, or bidirectional.

The plurality of microphones can be connected (e.g., connected to other microphones in the plurality of microphones, to a computing system, and/or other system or device) in various different ways. In some embodiments, the plurality of microphones can be connected in series, in parallel, or in a combination of series and parallel. Further, any of the plurality of microphones can include wired and/or wireless connections.

In some embodiments, any of the plurality of microphones can be adjustable and/or configured to be repositioned and/or relocated. For example, any of the plurality of microphones can be manually repositioned and/or mechanically repositioned using motors.

In some embodiments, the plurality of microphones can have a matching polarity. In particular, the sensitivity of the plurality of microphones to one or more sounds relative to an angle from which the sound is transmitted can be matched so that all of the plurality of microphones are within a predefined range.

In some embodiments, the plurality of microphones can be configured to receive the one or more sounds in a three-hundred and sixty degree radius around the autonomous vehicle. For example, an array of eight directional microphones can be arranged in a circular configuration on the roof of an autonomous vehicle, with each microphone oriented outwards to detect sound in a three-hundred and sixty degree radius around the autonomous vehicle.

The plurality of microphones can be arranged in different ways. For example, the plurality of microphones can have a different distance between one another and/or can be oriented in different directions/angles. In some embodiments, the plurality of microphones can be positioned on different portions of a vehicle including on top (e.g., a roof of the vehicle), on the sides (e.g., on doors or side windows of a vehicle), on the front (e.g., on the hood, front bumper, front windshield, or front grill of the vehicle), on the rear (e.g., on the trunk, rear bumper, or rear windshield), or below (e.g., any portion of an undercarriage of a vehicle). Further, the plurality of microphones can be angled, located, and/or positioned in different ways.

In some embodiments, at least two of the plurality of microphones can be at least one meter apart. For example, in an array of eight microphones mounted on a vehicle, a microphone at a front portion of the vehicle can be two and a half meters away from a microphone on a rear portion of the vehicle; and a microphone on a left side of the vehicle can be one and a half meters away from a microphone the right side of the vehicle.

In some embodiments, at least two of the plurality of microphones can be arranged in an orientation in which a sound detecting component of at least one of the plurality of microphones is at least perpendicular to a sound detecting component of at least one other microphone of the plurality of microphones. For example, in an array of four microphones, the sound detecting component of each microphone can be perpendicular to two other microphones and oriented one-hundred and eighty degrees away from one other microphone.

The audio computing system can determine a plurality of time differences. Further, the time differences can be based at least in part on the sound data. Each of the plurality of time differences can include a time difference between receipt of a source sound and receipt of a background sound at each of the plurality of microphones respectively. For example, the plurality of time differences can be expressed in milliseconds and can be based on the difference between the time at which a source sound was received by a microphone and the time at which a background sound was received at the same microphone.

In some embodiments, determining the plurality of time differences can include determining the plurality of time intervals at which one or more patterns of sound waves including an amplitude and frequency associated with the source sounds and the background sounds are received at each of the plurality of microphones respectively. The audio computing system can use one or more pattern recognition techniques (e.g., one or more machine-learning models configured and/or trained to recognize source sounds) to analyze one or more soundwaves including the amplitude and frequency of the one or more sounds to identify source sound and/or background sound and determine the time intervals at which the source sound and/or background sound were received.

For example, the audio computing system can use a pattern recognition technique to determine the first time interval at which a first source sound is received at a microphone and a second time interval at which a first background sound following the first source sound is received at the microphone. The difference in plurality of time differences can be based on the difference between the first time interval and the second time interval.

In some embodiments, the audio computing system can determine a sound type or sound class of the amplified source sound based at least in part on one or more patterns of sound waves including an amplitude and frequency associated with the amplified source sound. For example, the one or more patterns of the sound waves amplitude and frequency can be compared to sound profiles associated with known sounds. Further, the patterns of the sound waves that match (e.g., are determined to be within a predetermined range of similarity) one of the sound profiles can be determined to be of the same type as the matching sound profile.

In some embodiments, the sound type of the amplified source sound can include at least one of an ambulance signal sound, a police signal sound, and/or a fire engine signal sound.

In some embodiments, the audio computing system can use one or more machine-learned models (e.g., one or more machine-learned audio processing models) that have been configured and/or trained to detect, identify, and/or recognize source sounds and/or background sounds. For example, the one or more machine-learned models can be trained using a plurality of sound samples including source sounds (e.g., ambulance sirens, police sirens, and/or fire engine sirens) and background sounds (e.g., pedestrian crowd noise, engine noise, and/or conversation). The trained machine-learned models can then be used to detect, identify, and/or recognize some set of source sounds by receiving an input including the sound data and generating an output indicating whether the sound input includes any of the source sounds and/or the type of the source sounds that were detected.

Furthermore, in some embodiments, the one or more machine-learned models can be trained to indicate the times at which a source sound and/or a background were detected.

In some embodiments, as part of the process of training the one or more machine-learned models, differences in correct classification output between a machine-learned model and a set of classified sound labels associated with a plurality of training objects that have previously been correctly identified (e.g., ground-truth labels), can be processed using an error loss function that can determine a set of probability distributions based on repeated classification of the same plurality of training sounds. As such, the accuracy (e.g., the proportion of correctly identified sounds) of the machine-learned model can improve. For example, as the machine-learned model is exposed to a greater amount and variety of training data, the accuracy of the model can improve over time.

In some embodiments, the plurality of sound features classified by the one or more machine-learned models can include a range of range of different sounds produced at different amplitudes, different frequencies, and/or in a variety of different environments. Further, the plurality of sound features classified by the one or more machine-learned models can be associated with certain hardware configurations (e.g., specific types of microphones, specific models of microphones, and/or specific spatial arrangements of microphones).

In some embodiments, the audio computing system can use one or more Hidden Markov Models (HMMs) to determine the occurrence of the source sounds. For example, the one or more machine-learned models can use HMMs as part of classifying each of the source sounds that will be identified.

In some embodiments, the audio computing system can be configured to recognize patterns of sound waves including pauses or changes in the amplitude of the source sounds. For example, a warning whistle or horn of an approaching train can be punctuated by pauses of a predetermined duration that can be recognized and associated with the respective sound source (the train).

The audio computing system can synchronize a set of the source sounds based at least in part on the plurality of time differences. For example, the audio computing system can determine a time interval at which a source sound is first detected at a first receiving microphone of the plurality of microphones. The audio computing system can then determine the closest times at which the source sound is detected at the other microphones of the plurality of microphones. The audio computing system can then synchronize the source sounds of the other microphones with the first receiving microphone.

The audio computing system can generate an amplified source sound based at least in part on a combination of the synchronized set of the source sounds. For example, the audio computing system can align the maxima (e.g., maximum amplitude) and/or the minima (e.g., minimum amplitude) of the sound waves associated with the source sounds which have the same amplitude and frequency. This can result in constructive interference in which the amplitude of the resulting sound wave is greater than either sound wave individually.

The audio computing system can determine a source location of the source sounds based at least in part on the amplified source sound. For example, the audio computing system can triangulate the sound based at least in part on the amplified source sound that is generated based on the timing of the source sounds from two or more of the plurality of microphones.

The audio computing system can generate, based at least in part on the source location, one or more control signals. The one or more control signals can change or be used to change one or more actions performed by an autonomous vehicle. In some embodiments, the one or more control signals can be associated with performance of one or more actions by an autonomous vehicle. In some embodiments, the audio computing system can send one or more control signals including the source location in terms of its position relative to an associated autonomous vehicle. For example, the one or more control signals can indicate a distance and angle of the source location relative to the autonomous vehicle.

In some embodiments generating the amplified source sound can include generating the amplified source sound based at least in part on the set of the source sounds received by a set of the plurality of microphones. The plurality of microphones can include a first microphone of the plurality of microphones at which the amplitude of the set of the source sounds is greatest and at least one microphone adjacent to the first microphone. For example, in a microphone array that includes twelve microphones arranged in a circular configuration, a microphone at the nine o'clock position can detect the set of the source sounds (e.g., a set of source sounds including an emergency signal sound) at the highest amplitude. The adjacent microphones at the eight o'clock and twelve o'clock positions can then be used to generate the amplified source sound.

In some embodiments, determining the source location can include determining a temperature gradient of an environment around the autonomous vehicle. The temperature gradient of the environment can be based at least in part on data including temperature gradient data. Further, the audio computing system can determine the source location based at least in part on the temperature gradient. The temperature gradient can be based at least in part on data (e.g., temperature gradient data) indicating the temperature gradient of a geographical area as determined by one or more remote sources (e.g., weather stations that provide temperature gradient data based on monitor environmental conditions including the temperature, barometric pressure, and/or humidity of a geographic area). In some embodiments, the temperature gradient can be based at least in part on one or more signals that include temperature gradient data and are received from one or more computing devices associated with the one or more remote sources. By way of example, the audio computing system can use the temperature gradient to adjust the source location (e.g., the distance to the source location can be reduced when the temperature gradient indicates that the source sound is emanating from a location that is warmer than the current location).

In some embodiments, the temperature gradient can be determined, inferred, and/or based at least in part on at least one of a time of day, an air temperature around the autonomous vehicle, an air pressure around the autonomous vehicle, humidity around the autonomous vehicle, and/or an intensity of sunlight around the autonomous vehicle. For example, a thermometer on the vehicle can be used to determine the temperature in the immediate area (e.g., on the surface of the vehicle) around the vehicle, which can be put in the context of external information (e.g., temperature information) to estimate the temperature gradient in a wider area around the vehicle (e.g., within fifty meters of the vehicle).

In some embodiments, determining the source location can include determining a distance from the autonomous vehicle to the source sounds based at least in part on the amplitude of the amplified source sound. For example, after identifying the source sound, the audio computing system can access a profile that includes information associated with the amplitude of the source sound at a distance of half a meter. The audio computing system can then determine an estimated distance between the source sound and the autonomous vehicle based at least in part on the difference between the amplitude of the source sound at half a meter and the current amplitude of the source sound.

In some embodiments, determining the source location can include determining the source location of the source sounds over a plurality of time intervals. For example, the audio computing system can determine the source location of the source sounds over the course of five one second intervals. Further, the audio computing system can determine, based at least in part on one or more changes in an amplitude and/or frequency of the source sounds over the plurality of time intervals, whether the source location is moving towards the autonomous vehicle. For example, if the amplitude of the source sound is greater at a fifth one second time interval (after five seconds) than it was at the first one second time interval (after one second), the source location can be determined to be moving towards the autonomous vehicle.

The audio computing system can control one or more vehicle systems of the autonomous vehicle in order to perform one or more actions associated with the source location. The one or more vehicle systems can include at least one of one or more sensors, one or more notification systems, and/or one or more communications systems. For example, the one or more actions can include generating an audio message, via an in-vehicle speaker system, indicating that the vehicle will pull over to the side of the road due to an approaching fire engine.

In some embodiments, the one or more actions associated with the source location can include at least one of focusing a set of the one or more sensors towards the source location, generating one or more notifications associated with the source location, and/or generating one or more communications associated with the source location.

In some embodiments, the audio computing system can be configured to perform calibration operations to calibrate the plurality of microphones. The calibration operations can include the audio computing system sending one or more signals to an audio output device (e.g., a loudspeaker or an audio exciter) that generates one or more calibration sounds that are received and/or detected by each of the plurality of microphones. For example, the audio computing system can send a signal to an associated loudspeaker (e.g., a loudspeaker that is connected to the audio computing system) that generates one or more sounds that are received and/or detected by the plurality of microphones. Further, the audio computing system can determine the time at which the one or more sounds were produced by the loudspeaker. The calibration operations can also include determining a plurality of times at which each of the one or more calibration sounds were transmitted by the audio output device (e.g., the loudspeaker) and/or the plurality of times at which the one or more calibration sounds are received by each of the plurality of microphones. For example, the audio computing system can store time stamps corresponding to the time intervals at which each of the plurality of microphones receives and/or detects the one or more calibration sounds. Furthermore, the calibration operations can include calibrating the plurality of microphones based at least in part on one or more differences in the plurality of times at which the plurality of microphones received and/or detected the one or more calibration sounds. For example, the audio computing system can use the time stamps to determine the time delay between each of the plurality of microphones receiving and/or detecting the one or more calibration sounds. Further, the audio computing system can use the time delay when determining the time interval at which subsequent sounds are received by each of the plurality of microphones.

In some embodiments, the audio computing system can filter the background sounds based at least in part on the plurality of time differences. Filtering the background sound can include reducing the amplitude of the background sounds. For example, the amplitude of the background sounds can be reduced at the time intervals during which the background sounds occur.

In some embodiments, the one or more control signals can be used as an input to a motion planning system of the autonomous vehicle. For example, the one or more control signals can be used to provide a motion planning system with the source location, which can be used to generate a motion plan that maneuvers a vehicle around the source location.

In some embodiments, the one or more actions can include modifying a velocity of the autonomous vehicle, modifying an acceleration of the autonomous vehicle, and/or modifying a travel path of the autonomous vehicle. For example, based on determining that the source location of an emergency ambulance signal is approaching the vehicle, the one or more actions can include reducing the velocity of the vehicle until it stops, thereby allowing the ambulance to pass safely.

The systems, methods, devices, and non-transitory computer-readable media in the disclosed technology can provide a variety of technical effects and benefits including improving the effectiveness of sound detection and location in general as well as improving the operation of microphone arrays used to detect and locate sounds in particular. By more effectively distinguishing source sounds from background sounds based on the timing with which those sounds are received at different microphones of a microphone array, the disclosed technology can provide various benefits including improved vehicle safety, an improvement in the accuracy of detecting and locating sounds in an environment, an overall improvement in the utilization of computational resources that results from a more efficient sound detection and location, and reduced wear and tear on a vehicle.

More effective sound detection and location can allow for an improvement in safety for passengers inside a vehicle as well as individuals outside the vehicle including pedestrians, cyclists, and/or passengers of other vehicles. For example, more accurate detection and location of source sounds associated with emergency signal sounds can be used by an autonomous vehicle's perception and motion planning systems to more effectively pull over to facilitate the safe passage of emergency vehicles and their occupants.

The disclosed technology can achieve more efficient sound detection and location by leveraging the use of one or more machine-learned models including a machine-learned audio processing model. The one or more machine-learned models can be trained to more efficiently distinguish source sounds from background sounds in a noisy environment that produces sounds received by a plurality of microphones.

Furthermore, by using the one or more machine-learned models, the disclosed technology has the additional advantage of improved scalability. In particular, a machine-learned audio processing model can be continuously trained and improved without the need for burdensome manual derivations and adjustments that are often required in rules-based models or heuristic models that do not use machine-learning. For example, in a manually derived rules based model, a human designer would need to manually derive heuristic models that determine the various sounds in an environment that are associated with source sounds and background sounds including manually weighting parameters associated with different types of sound that are associated with various amplitudes and/or frequencies received by an array of microphones. As such, the task of crafting and adjusting a heuristic model is onerous relative to using a machine-learned audio processing model that is trained using training datasets. Further, the one or more machine-learned models in the disclosed technology can be trained using relevant training data including sound samples of a variety of source sounds (e.g., ambulances) and background sounds (e.g., crowd noise). Additionally, the one or more machine-learned models can be readily revised as new training data becomes available or new uses for the one or more machine-learned models are envisioned.

The use of machine-learned models to determine source sounds and background sounds an environment before passing the sound data to a perception system can reduce the burden on the perception system and other autonomous vehicle systems that rely on sound data. For example, sound data that includes less noise can result in less usage of computational resources including memory resources, processor resources, and/or bandwidth used to transmit the sound data between systems.

The disclosed technology can also improve the operation of a vehicle by reducing the amount of wear and tear on vehicle components through more gradual adjustments in the vehicle's travel path that can be performed based on the more accurate detection and location of source sounds produced in an environment. For example, more accurate sound detection and location of source sounds can result in better performance by perception systems of an autonomous vehicle which can in turn result in a safer and smoother ride with fewer sudden stops and course corrections that impose strain on a vehicle's engine, braking, and steering systems. Additionally, fewer course corrections and smoother course adjustments have the added benefit of reducing fuel consumption and improving the comfort of passengers when the vehicle is in transit.

Accordingly, the disclosed technology provides a host of improvements to the detection and location of certain sounds in an environment in general. These improvements are achieved in part by analysis of the timing at which sounds are received by different microphones of a microphone array. Furthermore, the improvements offered by the disclosed technology can result in tangible benefits to a variety of systems including the mechanical, electronic, and computing systems of autonomous devices (e.g., autonomous vehicles).

With reference now to FIGS. 1-8, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a plurality of microphones 110; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more services to a plurality of users via a fleet of vehicles that can include, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform one or more operations and/or functions including any of the operations and/or functions of the one or more remote computing devices 106 and/or the vehicle computing system 112. Furthermore, the operations computing system 104 can perform one or more operations and/or functions including receiving sound data associated with sounds including source sounds and background sounds; determining time differences associated with a time difference between receipt of a source sound and receipt of a background sound at each of a plurality of microphones respectively; synchronizing a set of the source sounds based at least in part on the time differences; generating an amplified source sound based at least in part on a combination of the synchronized set of the source sounds; determining a source location of the source sounds based at least in part on the amplified source sound; and generating, based at least in part on the source location, one or more control signals to change actions performed by a vehicle (e.g., the vehicle 108).

Figure 5:
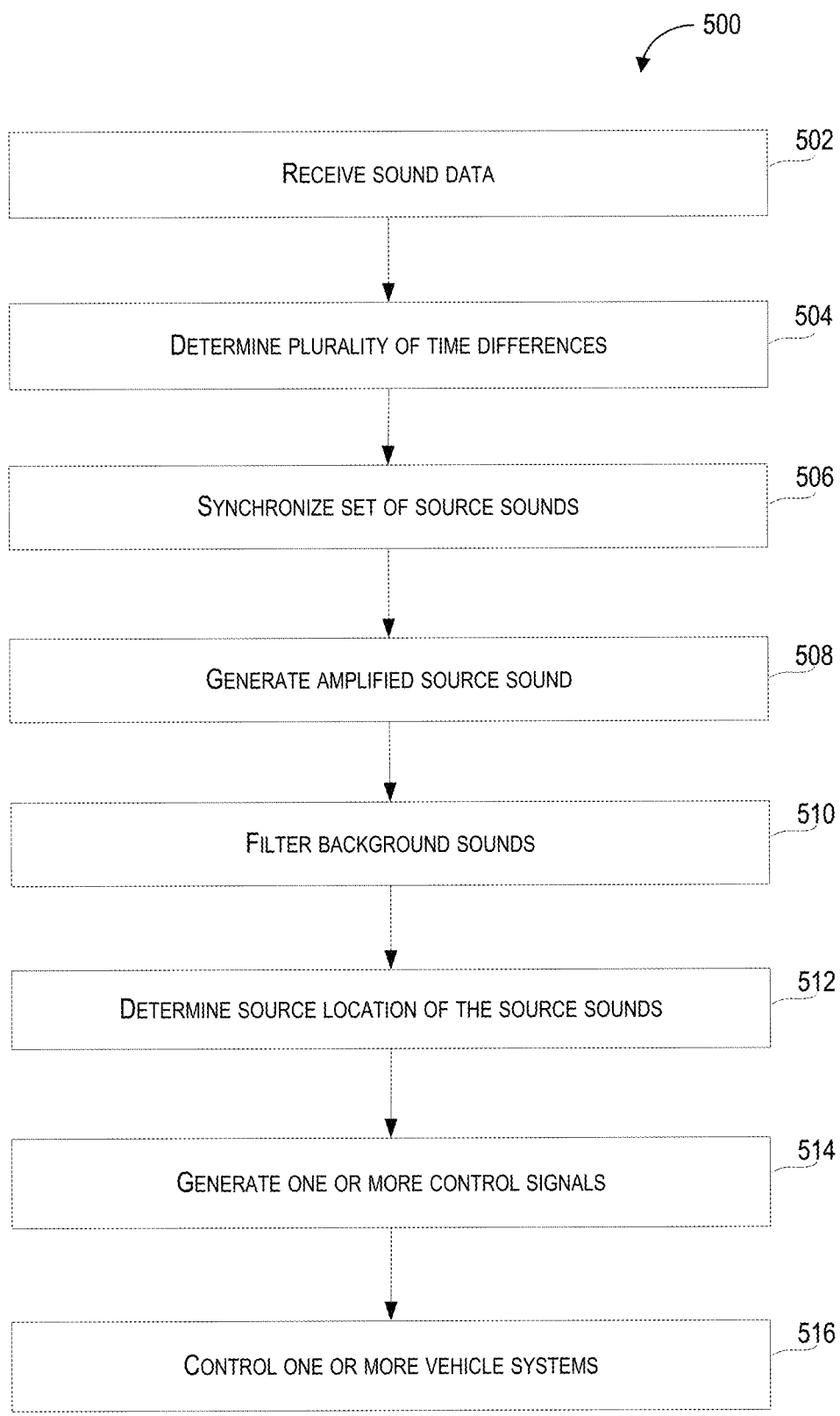
FIG. 5 depicts a flow diagram of an example method of detecting and locating sound signals according to example embodiments of the present disclosure.
Figure 6:
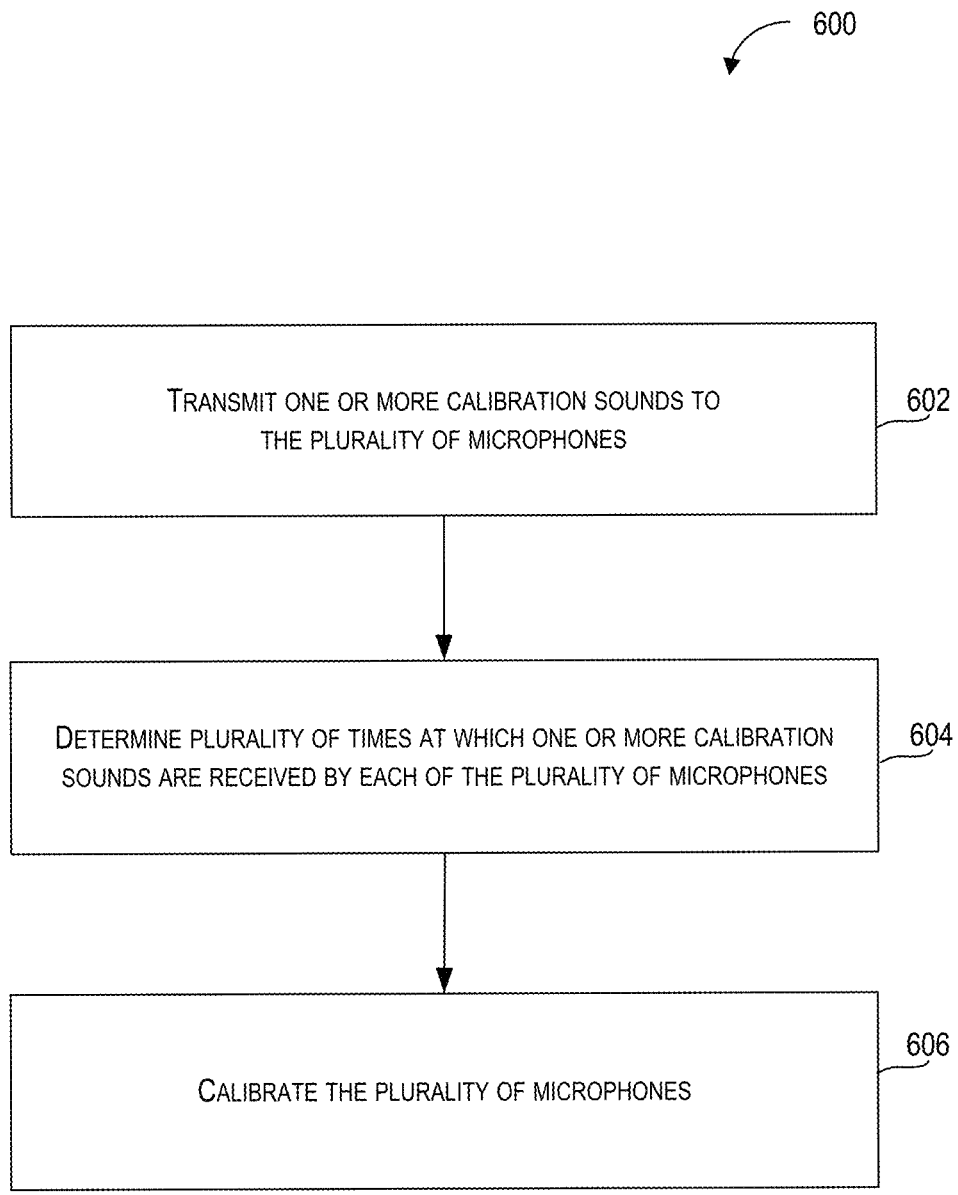
FIG. 6 depicts a flow diagram of an example method of detecting and locating sound signals according to example embodiments of the present disclosure.

Furthermore, the one or more memory devices of the operations computing system 104 can store data including instructions used to implement one or more machine-learned models that have been configured and/or trained to generate an output based at least in part on an input provided to the one or more machine-learned models. For example, the one or more machine-learned models stored in the one or more memory devices of the operations computing system 104 can include one or more convolutional neural networks, one or more residual convolutional neural networks, one or more recurrent neural networks, and/or one or more recursive neural networks. Further, the one or more machine-learned models stored in the one or more memory devices of the operations computing system 104 can include one or more machine-learned audio processing models, that are described herein, including in the methods 500-600 that are depicted in FIGS. 5 and 6.

Furthermore, the operations computing system 104 can be configured to monitor and communicate with the vehicle 108 and/or its users to coordinate a vehicle service provided by the vehicle 108. To do so, the operations computing system 104 can manage a database that includes data including state data associated with the state of one or more objects including one or more objects external to the vehicle 108. The state data can include a location of an object (e.g., a latitude, longitude, and/or altitude of an object detected by the one or more sensors 114 of the vehicle 108), the state of a vehicle (e.g., the velocity, acceleration, heading, position, and/or location of the vehicle 108), and/or the state of objects external to a vehicle (e.g., the physical dimensions, velocity, acceleration, heading, shape, sound, and/or appearance of objects external to the vehicle). In some embodiments, the state data can include one or more portions of the sensor data and/or the sound data that is described herein.

The operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. Furthermore, the one or more memory devices of the one or more remote computing devices 106 can be used to store data including the sensor data, the training data, and/or the one or more machine-learned models that are stored in the operations computing system 104.

The one or more remote computing devices 106 can communicate (e.g., send and/or receive data and/or signals) with one or more devices including the operations computing system 104 and the vehicle 108 via the communications network 102. For example, the one or more remote computing devices 106 can request the location of the vehicle 108 or the state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, acceleration, a trajectory, and/or a path of the vehicle 108 based in part on signals or data exchanged with the vehicle 108. In some implementations, the operations computing system 104 can include the one or more remote computing devices 106.

The vehicle 108 can be a ground-based vehicle (e.g., an automobile, a motorcycle, a train, a tram, a tracked vehicle, a light electric vehicle, a moped, a scooter, and/or an electric bicycle), an aircraft (e.g., aircraft including a fixed-wing airplane, a helicopter, a vertical take-off and landing aircraft, and/or a tiltrotor aircraft), a boat, a submersible vehicle (e.g., a submarine), an amphibious vehicle, a hovercraft, a robotic device (e.g. a bipedal, wheeled, or quadrupedal robotic device), and/or any other type of vehicle. Further, the vehicle 108 can include a vehicle that can be towed, pushed, and/or carried by another vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a manually operated mode (e.g., driven by a human driver), a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

The plurality of microphones 110 can be included in and/or associated with the vehicle 108 and/or the vehicle computing system 112. The plurality of microphones 110 can be configured to detect and/or receive sounds (e.g., background sounds and/or source sounds) that are transmitted and/or produced in an environment in which the vehicle 108 and/or the vehicle computing system 112 is present. The plurality of microphones 110 can include any type of microphone including omnidirectional, unidirectional, and/or bidirectional microphones. Furthermore, the plurality of microphones 110 can be located on any portion of the exterior and/or interior of the vehicle 108. For example, the plurality of microphones 110 can be located on the roof of the vehicle 108, the doors of the vehicle 108, the trunk of the vehicle 108, the hood of the vehicle 108, the undercarriage of the vehicle 108, the front or rear bumper of the vehicle 108, inside the passenger compartment of the vehicle 108, and/or the undercarriage of the vehicle 108. Further, the plurality of microphones 110 can be configured to be attached and/or mounted on any portion of the vehicle 108. For example, the plurality of microphones 110 can configured to be attached to the roof of the vehicle 108 and can also be configured to be detached and reattached from the roof of the vehicle 108. In some embodiments, the plurality of microphones 110 can be associated with at least one audio output device (not shown) that can be configured to produce and/or transmit sounds, and which can be used to calibrate the plurality of microphones 110. For example, the at least one audio output device can include a loudspeaker that is configured to transmit one or more calibration sounds that are used to calibrate the plurality of microphones 110.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, sound, and/or appearance of the one or more objects) can be stored locally in one or more memory devices of the vehicle 108. Furthermore, the vehicle 108 can provide data indicative of the state of the one or more objects (e.g., physical dimensions, velocity, acceleration, heading, location, sound, and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions including any of the one or more operations and/or functions performed by the operations computing system 104 and/or the one or more remote computing devices 106. Further, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including receiving sound data associated with one or more sounds including source sounds and/or background sounds; determining time differences associated with a time difference between receipt of a source sound and receipt of a background sound at each of a plurality of microphones respectively; synchronizing a set of the source sounds based at least in part on the time differences; generating an amplified source sound based at least in part on a combination of the synchronized set of the source sounds; determining a source location of the source sounds based at least in part on the amplified source sound; and generating, based at least in part on the source location, one or more control signals to change actions performed by a vehicle. Furthermore, the one or more memory devices of the vehicle computing system 112 can be used to store data including the sensor data, the sound data, the training data, and/or the one or more machine-learned models that are stored in the operations computing system 104.

Furthermore, the vehicle computing system 112 can perform one or more operations associated with the control, exchange of data, and/or operation of various devices and systems including vehicles, robotic devices, augmented reality devices, and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of one or more of the one or more sensors 114). The one or more sensors 114 can include one or more microphones (e.g., a microphone array including a plurality of microphones), one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include sound data, image data, radar data, LiDAR data, sonar data, and/or other data acquired by the one or more sensors 114. The one or more objects detected by the one or more sensors 114 can include, for example, pedestrians, cyclists, vehicles, bicycles, buildings, roads, sidewalks, trees, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, the sensor data 116 can be indicative of one or more sounds associated with one or more objects in an environment detected by the one or more sensors 114 including a plurality of microphones. By way of further example, the sensor data 116 can be indicative of sound patterns (e.g., sound waves) associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan navigates the vehicle 108 around the current and/or predicted locations of one or more objects detected by the one or more sensors 114. The autonomy computing system 120 can control the one or more vehicle control systems 138 to operate the vehicle 108 according to the motion plan. In some implementations, one or more systems of the autonomy computing system 120 can be combined. For example, in some implementations, the perception and prediction functions described herein can be performed by the same system.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class, vehicle class, or bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 relative to one or more objects detected by the one or more sensors 114 including one or more radar devices. By way of further example, the autonomy computing system 120 can provide one or more outputs including a graphical display of the location of the vehicle 108 on a map of a geographical area within one kilometer of the vehicle 108, including the locations of objects around the vehicle 108. A passenger of the vehicle 108 can interact with the one or more human-machine interfaces 140 by touching a touchscreen display device associated with the one or more human-machine interfaces to indicate, for example, a stopping location for the vehicle 108.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
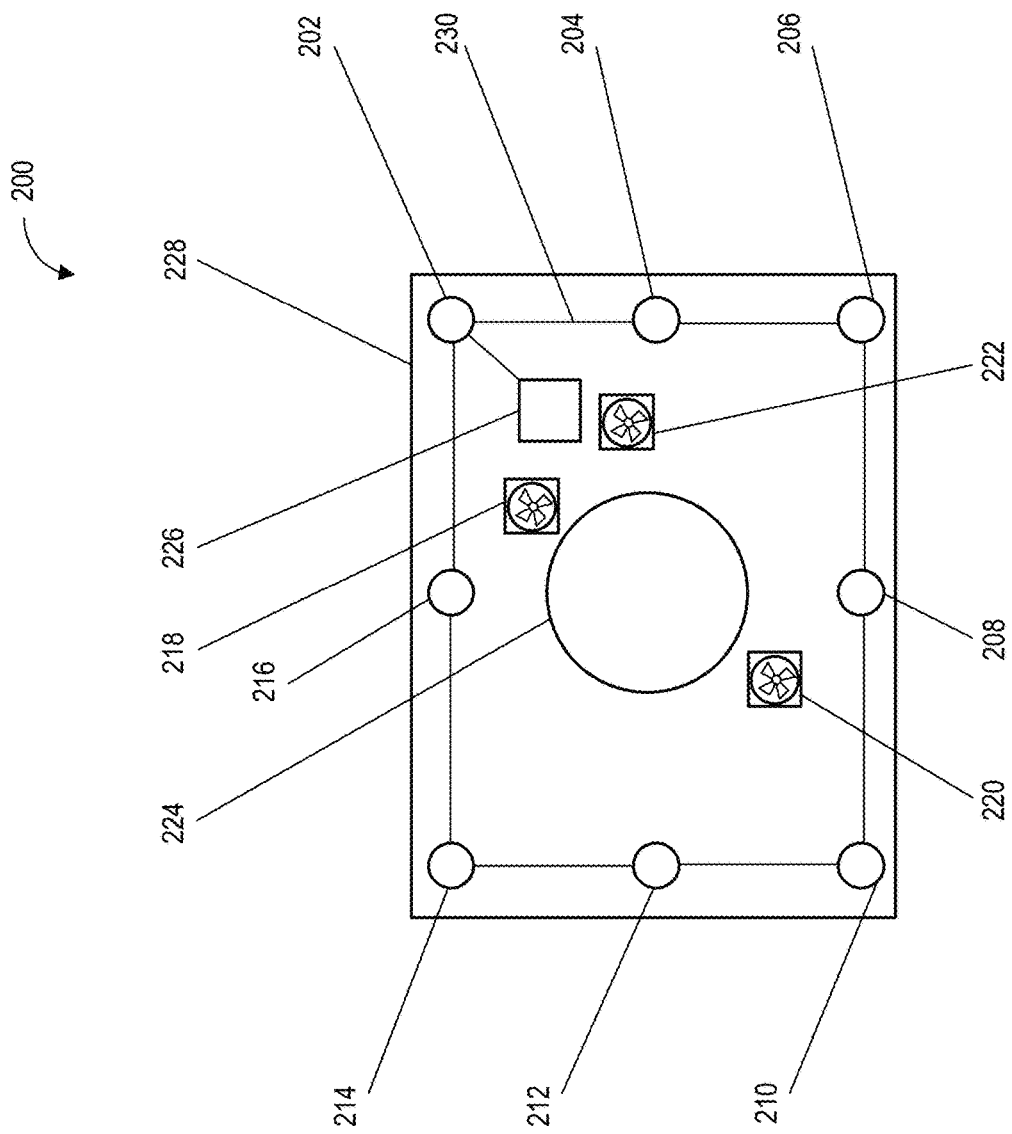
FIG. 2 depicts an example aspect of a computing system comprising a microphone array according to example embodiments of the present disclosure.

FIG. 2 depicts an example aspect of a computing system comprising a microphone array according to example embodiments of the present disclosure. One or more operations and/or functions in FIG. 2 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 2 can include one or more features, attributes, and/or capabilities of one or more devices and/or systems including, for example, the operations computing system 104, the vehicle 108, or the vehicle computing system 112, which are depicted in FIG. 1.

As illustrated, FIG. 2 shows an example of a system 200 including a microphone 202, microphone 204, a microphone 206, a microphone 208, a microphone 210, a microphone 212, a microphone 214, a microphone 216, a fan 218, a fan 220, a fan 222, a LiDAR device 224, an audio computing system 226, an enclosure 228, and one or more connections 230.

The microphones 202-216 include a plurality of microphones that can include any combination of omnidirectional, unidirectional, and/or bidirectional microphones. By way of example, each of the microphones 202-216 can include directional microphones that are configured to detect and/or be more sensitive to sounds that are transmitted from a particular range of locations (e.g., directly in front of a microphone) relative to the sound sensing components (e.g., diaphragm and/or coil) of the microphones 202-216 and less sensitive to sounds that are transmitted from outside that particular range (e.g., behind a microphone).

In this example, the microphones 202-216 are arranged around the periphery of the enclosure 228 which can be configured to be attached to another device (e.g., a vehicle). Further, the microphones 202-216 can be connected (e.g., connected to one another or to another devices) using a variety of connections including wired or wireless connections. In this example, the microphones 202-216 are connected in series via the one or more connections 230, such that the first microphone in the series is microphone 202 and the last microphone in the series is the microphone 216, with the microphones 204-214 comprising the second through seventh microphones in the series respectively. Further, microphone 202 is connected to the microphone 204 which is the second microphone in the series, the microphone 216 which is the last microphone in the series, as well as to the audio computing system 226 which is configured to receive signals from the microphone 202 and/or send signals to the microphone 202. In some embodiments, various different combinations of the microphones 202-216 can be connected to one another, to the audio computing device 226, and/or one or more other devices.

The fans 218-222 can include any combination of axial fans, centrifugal fans, mixed flow fans, and/or cross-flow fans. The fans can be configured to provide cooling to components including the LiDAR device 224 and/or the audio computing system 226. For example, the fans 218-220 can provide cooling to the LiDAR device 224 and the fan 222 can provide cooling to the audio computing system 226. Any of the fans 218-222 can produce sound when in operation and/or when air flows past the fans 218-222. Further, the fans 218-222 can reflect sound that is transmitted from external objects including other fans of the fans 218-222. The sound resulting from any of the fans 218-222 can be detected by any of the microphones 202-216. Further, the sound resulting from any of the fans 218-222 can interfere with the detection of other sounds (e.g., source sounds) by any of the microphones 202-216.

The LiDAR device 224 can be configured to spin or turn around a central axis, thereby allowing light from one or more lasers mounted on the LiDAR device 224 to illuminate and reflect off nearby objects that are around the LiDAR device 224. The spinning or turning movement of the LiDAR device 224 can be a source of background sound (e.g., noise that is not associated with a source sound) when in operation and/or when air flows past the LiDAR device 224. Further, the LiDAR device 224 can reflect sound including sound produced by other devices including the fans 218-222. The sound resulting from the LiDAR device 224 can be detected by any of the microphones 202-216. Further, the sound resulting from LiDAR device 224 can interfere with the detection of other sounds (e.g., source sounds) by any of the microphones 202-216.

The audio computing system 226 can be configured to filter background sounds, which can include sounds produced by or resulting from the fans 218-222 and/or the LiDAR device 224. For example, the audio computing system 226 can use one or more techniques including noise filtering techniques and/or one or more machine-learning models that are configured and/or trained to distinguish between background sounds (e.g., the sound of the fans 218-222 and/or the LiDAR device 224) and source sounds (e.g., the sound of an ambulance siren). Further, the audio computing system 226 can be calibrated to reduce or eliminate the latency associated with signals transmitted between the microphones 202-216 and/or the audio computing system 226 via the one or more connections 230.

Figure 3:
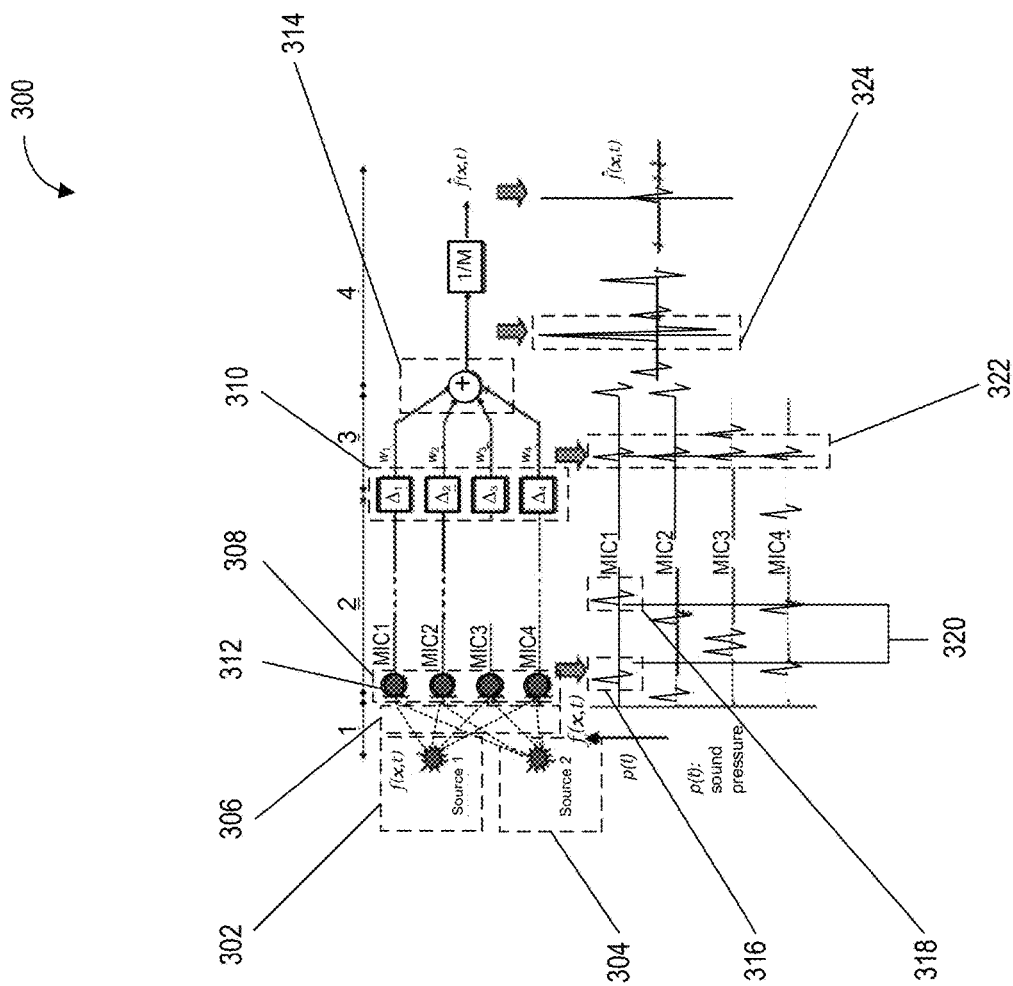
FIG. 3 depicts a technique for timing and amplifying sound signals according to example embodiments of the present disclosure.

FIG. 3 depicts a technique for timing and amplifying sound signals according to example embodiments of the present disclosure. One or more operations and/or functions in FIG. 3 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 3 can include one or more features of one or more devices and/or systems including, for example, the operations computing system 104, the vehicle 108, or the vehicle computing system 112, which are depicted in FIG. 1.

As illustrated, FIG. 3 shows an example technique locating and amplifying sound signals 300 including source 302, source 304, one or more sounds 306, a plurality of microphones 308, a plurality of time differences 310, microphone 312, a combination of aligned sound signals 314, a source sound signal 316, a background sound signal 318, a combination of aligned sound signals 320, a synchronized source sounds 322, and an amplified source sound 324.

In this example, the source 302 (e.g., a source that will be located and/or identified and from which source sounds are produced) and the source 304 (e.g., a background source that will be filtered and/or ignored) produce the one or more sounds 306 (e.g., a combination including source sounds produced by the source 302 and background sounds produced by the source 304). For example, the source 302 can be an ambulance that produces source sounds including the wail of the ambulance siren and the source 304 can be a chainsaw that produces background sounds including the sound of the chainsaw itself as well as the sound of wood being cut by the chainsaw. The one or more sounds 306 are detected by the plurality of microphones 308, which are part of a microphone array in which the plurality of microphones 308 are positioned in a square configuration with each microphone positioned at a corner of the square.

An audio computing system (e.g., a computing system with any of the attributes and/or capabilities of the vehicle computing system 112) associated with the plurality of microphones 308 can analyze the plurality of time differences 310, which includes differences in the timing of receiving and/or detecting the one or more sounds 306 by each of the plurality of microphones 308. For example, the plurality of timing differences 310 can include differences in the timing at which the one or more sounds 306 are received and/or detected by each of the plurality of microphones 308 and can be measured in milliseconds. The combination of aligned sound signals 314 includes a combination of sound signals that can be determined using superposition of sound waves associated with each of the sound signals generated by each of the plurality of microphones 308 respectively.

The source sound signal 316 illustrates a sound signal that represents a sound wave associated with the one or more sounds 306 that are detected by the microphone 312 (one of the plurality of microphones 308). Information associated with characteristics of the one or more sounds 306 including the amplitude, frequency, phase, and/or shape of the one or more sounds 306, can be used to distinguish the source sound signal 316 (e.g., a sound signal associated with source sounds) from the background sound signal 318 (e.g., a sound signal associated with background sounds). By way of example, various sound detection and/or recognition techniques including use of a machine-learned model (e.g., a machine-learned sound detection and recognition model) can be used to detect one or more sounds including source sounds.

The combination of aligned sound signals 320 is an alignment of the source sound signal 316 with sound signals that are the same or similar and produced by the other three microphones of the plurality of microphones 308. The synchronized source sounds 322 includes the superposition of the source sound signal 316 with sound signals that are the same or similar and produced by the other three microphones of the plurality of microphones 308. The superposition of the source sound signals can allow for better accuracy in the detection, identification, and/or recognition of the source location of a source sound and/or the identity of source sounds.

Figure 4:
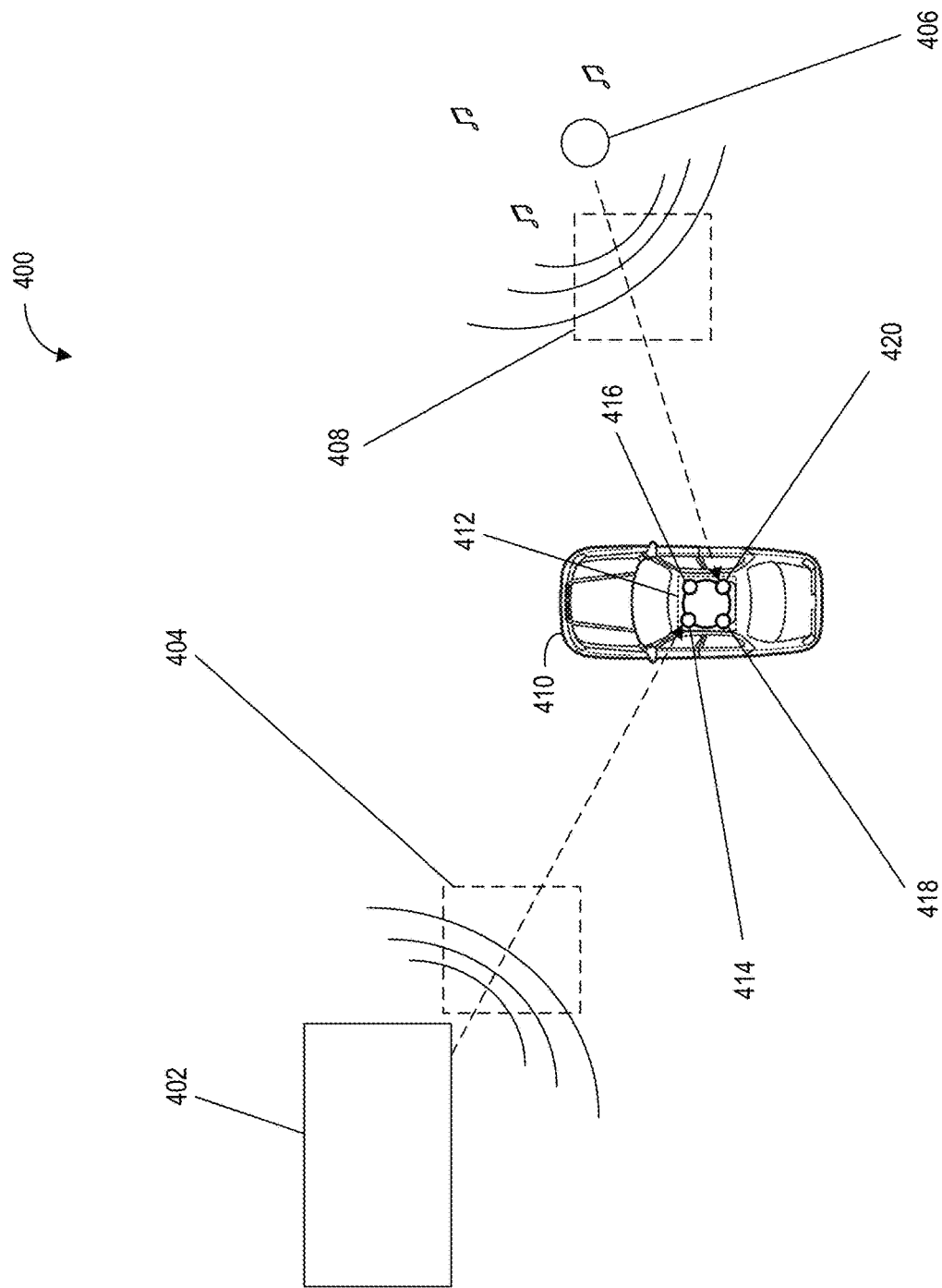
FIG. 4 depicts an example of sound signal detection and location in an environment according to example embodiments of the present disclosure.

FIG. 4 depicts an example of sound signal detection and location in an environment according to example embodiments of the present disclosure. One or more operations and/or functions in FIG. 4 can be implemented and/or performed by one or more devices (e.g., one or more computing devices) and/or systems including, for example, the operations computing system 104, the vehicle 108, or the vehicle computing system 112, which are depicted in FIG. 1.

As illustrated, FIG. 4 shows an environment 400 that includes a source object 402, source sounds 404, a background object 406, background sounds 408, a vehicle 410, a microphone array 412, a microphone 414, a microphone 416, a microphone 418, and a microphone 420.

The environment 400 can, for example, include an urban or suburban environment in which there are many sources of natural sounds (e.g., birds singing, laughter, wind noise, and/or dogs barking) and/or artificial sounds (e.g., the sound of machinery and/or amplified music playing from an audio device). In this example, the environment 400 includes the source object 402 (e.g., a fire engine at a source location from which the source sounds 404 are produced), the background object 406 (e.g., an audio device producing the background sounds 408), and the vehicle 410 (e.g., a vehicle including any of the attributes and/or capabilities of the vehicle 108) on which the microphone array 412 is mounted (e.g., mounted atop the roof of the vehicle 410).

The microphone array 412 (e.g., a plurality of microphones) includes the microphones 414-420 which are configured so that the microphone 414 (e.g., the microphone that is closest to the source object 402) is positioned above the front driver's portion of the vehicle 410 (e.g., the front-left side of a passenger compartment of the vehicle 410), the microphone 416 is above the front-right passenger's portion of the vehicle 410 (e.g., the front-right side of a passenger compartment of the vehicle 410), the microphone 418 is positioned above the left-rear passenger's portion of the vehicle 410 (e.g., the rear-left side of a passenger compartment of the vehicle 410), and the microphone 420 (e.g., the microphone that is furthest away from the source object 402) is positioned above the right-rear driver's portion of the vehicle 410 (e.g., the front-left side of a passenger compartment of the vehicle 410).

In this example, the source object 402 produces the source sounds 404 (e.g., the sounds produced by a fire engine siren). The source sounds 404 are detected by the microphones 414-420, which are part of the microphone array 412. The microphone 414, which is closest to the source object 402 will receive and detect the source sounds 404 before the microphones 416-420, each of which will also receive and detect the source sounds 404 at different times. Further, partly as a result of the different locations of the microphones 414-420, the difference in the timing at which the source sounds 404 are received by the microphones 414-420 can be used to determine the location of the source object 402 that produces the source sounds 404 (e.g., determine the location and/or identity of the source object 402 and the source sounds 404 using a computing system with any of the attributes and/or capabilities of the vehicle computing system 112).

The background object 406 (e.g., an audio device producing background sounds including music) produces the background sounds 408 (e.g., the sound of music). Further, the background sounds 406 are detected by the microphones 414-420 that are part of the microphone array 412. A computing system (e.g., a computing system with any of the attributes and/or capabilities of the vehicle computing system 112) can be configured to determine that the background sounds 408 are noise (e.g., sounds that do not include source sounds including the source sounds 404 and that are not used to locate and/or identify a source object) and can filter the background sounds 408.

FIG. 5 depicts a flow diagram of an example method of detecting and locating sound signals according to example embodiments of the present disclosure. One or more portions of a method 500 can be implemented by one or more devices (e.g., one or more computing devices) or systems including, for example, the operations computing system 104, the vehicle 108, or the vehicle computing system 112, shown in FIG. 1. Moreover, one or more portions of the method 500 can be implemented as an algorithm on the hardware components of the devices described herein (e.g., as in FIG. 1). FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 502, the method 500 can include receiving, accessing, obtaining, and/or retrieving sound data. The sound data can be associated with one or more sounds. The one or more sounds can include source sounds (e.g., sounds determined to be significant including sounds associated with emergency vehicles) and/or background sounds (e.g., noise and/or sounds not including the source sounds) received by each of a plurality of microphones and/or a subset of the plurality of microphones (e.g., three microphones of a plurality of four microphones).

By way of example, a plurality of microphones can be attached to the roof of a vehicle and oriented to capture sounds transmitted from a three-hundred and sixty degrees range around the vehicle. When the plurality of microphones receives sounds, signals associated with the sounds can be transmitted to a computing device (e.g., the vehicle computing system 112) that generates sound data based at least in part on the signals. In some embodiments, the sound data can include information associated with one or more times (e.g., timestamps) at which sounds and/or portions of sounds were received by the microphones. Further, the sound data can include information associated with the amplitude and/or frequency of sounds; and/or the shape of sound waves associated with the sounds.

At 504, the method 500 can include determining a plurality of time differences. The plurality of time differences can be based at least in part on the sound data. Each of the plurality of time differences can include or be associated with a time difference between receipt of a source sound and receipt of a background sound at each of the plurality of microphones respectively. Determining the plurality of time differences can include detecting, identifying, and/or recognizing one or more portions of the sound data that is associated with the source sounds and/or background sounds. For example, various sound detection, identification, and/or recognition techniques (e.g., a machine-learned model configured and/or trained to recognize source sounds) can be used to determine the source sounds and/or background sounds. Once the source sounds and/or background sounds have been detected, identified, and/or recognized, the times at which the source sounds and/or background sounds are received can be determined. Based at least in part on the times at which the source sounds and/or background sounds were received, the time differences between receipt of one or more source sounds (e.g., a source sound) and receipt of one or more background sounds (e.g., a background sound) at each of the plurality of microphones respectively can be determined.

At 506, the method 500 can include synchronizing a set of the source sounds. The set of source sounds can be synchronized based at least in part on the plurality of time differences. For example, the source sounds that are determined to have been received and/or detected at different times by each microphone of the plurality of microphones can be identified and synchronized. By way of further example, the sound waves associated with the set of source sounds can be aligned, thereby synchronizing the source sounds that were received by each of the plurality of microphones at different times.

At 508, the method 500 can include generating an amplified source sound based at least in part on a combination of the synchronized set of the source sounds. When combined, the synchronized set of the source sounds can constructively interfere with one another, thereby resulting in an amplified source sound that has an amplitude that is greater than any of the individual source sounds.

At 510, the method 500 can include filtering the background sounds. The background sounds can be filtered based at least in part on the plurality of time differences. The filtering can include reducing the amplitude of the background sounds. Filtering the background sounds can include using a variety of filtering techniques to attenuate background sounds that have frequencies within a specified range. For example, the background sounds can be filtered through use of a frequency dependent audio filter that can include high-pass filters, low-pass filters, band-pass filters, and/or all-pass filters. Further, filtering the background sounds can include the use of one or more machine-learned models that have been configured and/or trained to filter background sounds.

At 512, the method 500 can include determining a source location of the source sounds. The source location of the source sounds can be determined based at least in part on the amplified source sound and/or the plurality of time differences. The source location can include information associated with: a distance of the source location from at least one of the plurality of microphones, a direction relative to at least one of the plurality of microphones (e.g., an angle or range of angles relative to some point of reference on a microphone or an object external to the microphone), and/or a geographic location (e.g., a longitude, latitude, and/or altitude).

The plurality of time differences can be used to determine the different times at which the source sounds are received and/or detected by each microphone of the plurality of microphones. Further, the plurality of time differences can be used to determine the direction from which the source sounds emanate since the microphones that are located closer to the source sounds will receive and/or detect the source sounds before the microphones that are further away from the source sounds. Further, comparisons of various aspects of the source sounds including the phase and/or amplitude of the source sounds at each of the plurality of microphones can be used to determine the location of the source sounds.

In some embodiments, location of the source sounds can include triangulation of the source sounds. For example, triangulating the location of the source sounds can include using the known location of each of the plurality of microphones and the different times at which each of the plurality of microphones receive and/or detect the source sounds to determine the location of the source sounds and/or the source location associated with the source sound.

In some embodiments, location of the source sounds can include use of one or more beamforming techniques. By way of example, when using a beamforming technique, each microphone of the plurality of microphones can be positioned in a way that allows for constructive interference (e.g., sounds are amplified) of one or more sounds that come from certain directions and/or angles and destructive interference (e.g., sounds are attenuated) of one or more sounds that come from other directions and/or angles. The beamforming technique can use the differences in which one or more sounds are received and/or detected (e.g., differences based on one or more comparisons of phase and/or amplitude of the one or more sounds) by the plurality of microphones to determine the location of the sounds.

Furthermore, the amplified source sound can allow for better identification and/or recognition of the source of the source sound. For example, the amplified source sound can be more readily identified and/or recognized in comparison to a source sound with a lower amplitude that is less identifiable, especially when the lower amplitude source sound occurs in a noisy environment.

At 514, the method 500 can include generating one or more control signals. The one or more control signals can be based at least in part on the source location and/or an identity of the source sounds. The one or more control signals can change, or be used to change, one or more actions performed by an autonomous vehicle. Further, the one or more signals can include information and/or data that is used to indicate the one or more actions to be performed by a device including an autonomous vehicle. For example, the one or more control signals can include information associated with: the location of the source sounds which can include the distance and/or direction of the source location relative to the plurality of microphones; and/or the identity of the source sounds (e.g., whether the source sounds are from an ambulance or a fire engine). The information about the source location and/or identity of the source sounds can be used by one or more vehicle systems.

At 516, the method 500 can include controlling one or more vehicle systems of the autonomous vehicle to perform one or more actions associated with the source location and/or an identity of the source sounds. In some embodiments, the one or more actions can be performed based at least in part on the one or more control signals. The one or more vehicle systems can include at least one of one or more sensors (e.g., the plurality of microphones, one or more cameras, one or more LiDAR devices, one or more radar devices, and/or one or more sonar devices), one or more notification systems, and/or one or more communications systems.

For example, the one or more control signals can include information associated with the identity of the source sounds and/or the source location. The control signals can be sent to a notification system of a vehicle that can generate audio output indicating the identity of the source sounds (e.g., "An ambulance is approaching.") and location of the source location (e.g., "The ambulance is eighty meters behind the vehicle.") relative to the vehicle.

Furthermore, the source location can be used to direct one or more sensors including a camera of the vehicle. Based on the source location, a camera oriented in the direction of the source location can be used to capture images of objects in that direction (e.g., the direction of the source location). For example, when source sounds are located behind the vehicle, rear vehicle cameras can be controlled and can send images to a display device within the vehicle that can be viewed by a passenger of the vehicle.

In some embodiments, any of the plurality of microphones can be configured to move (e.g., a mechanism to change the position of any of the plurality of microphones). Based at least in part on the source location and/or the identity of the source sounds, any of the plurality of microphones can be moved.

FIG. 6 depicts a flow diagram of an example method of detecting and locating sound signals according to example embodiments of the present disclosure. One or more portions of a method 600 can be implemented by one or more devices (e.g., one or more computing devices) or systems including, for example, the operations computing system 104, the vehicle 108, or the vehicle computing system 112, shown in FIG. 1. Moreover, one or more portions of the method 600 can be implemented as an algorithm on the hardware components of the devices described herein (e.g., as in FIG. 1). FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 602, the method 600 can include generating, transmitting, and/or producing one or more sounds (e.g., one or more calibration sounds). The one or more sounds can be generated by an audio output device (or a set of audio output devices) that can be located within a predetermined distance of the plurality of microphones. For example, an audio output device located one meter away from each of a plurality of microphones can transmit one or more calibration sounds that are received and/or detected by each of the plurality of microphones. In some embodiments, a device (e.g., the audio output device) that generates, transmits, and/or produces the one or more calibration sounds can determine the one or more times at which the one or more calibration sounds were transmitted.

In another embodiment, a computing system associated with the plurality of microphones (e.g., the audio computing system 226 that is depicted in FIG. 2) can be associated with the audio output device and determine the times at which each of the one or more calibration sounds were transmitted. In some embodiments, the audio output device can be located at the same distance from the plurality of microphones, the same distance from some of the plurality of microphones and a different distance from other microphones of the plurality of microphones, or at different distances from each of the plurality of microphones.

At 604, the method 600 can include determining a plurality of times at which the one or more calibration sounds are received by each of the plurality of microphones and/or a computing system associated with the plurality of microphones. The times at which the one or more calibration sounds are received at each of the microphones can be determined using a timing device that is connected to and/or associated with each of the plurality of microphones.

In some embodiments, a device and/or system (e.g., the audio computing system 226 that is depicted in FIG. 2) that generates, transmits, and/or produces the one or more calibration sounds; and/or a device or system associated with the plurality of microphones, can determine the times at which each of the one or more calibration sounds was received and/or detected by each of the plurality of microphones.

At 606, the method 600 can include calibrating the plurality of microphones. The plurality of microphones can be calibrated based at least in part on one or more differences in the plurality of times at which the plurality of microphones and/or a computing system associated with the plurality of microphones received and/or detect one or more calibration sounds. For example, the differences in the plurality of times at which each of the plurality of microphones received and/or detected the one or more calibration sounds can be used to determine latency associated with any of the plurality of microphones. The latency associated with each of the plurality of microphones can be used when determining the plurality of time differences and/or plurality of times at which one or more sounds including the source sounds and/or background sounds are received and/or detected by each of the plurality of microphones.

By way of example, the plurality of microphones can include four microphones, each of which is located at a different distance from an audio output device (e.g., a loudspeaker) that generates one or more calibration sounds. A first microphone can be located the closest to the audio output device, the second microphone can be located the second closest to the audio output device, the third microphone can be located the third closest to the audio output device, and the fourth microphone can be located the furthest away from the audio output device. Further, the one or more times at which the one or more calibration sounds are transmitted by the audio output device can be determined. Aside from their respective locations, if all else is equal about the configuration of the microphones, their respective interconnects, and the audio computing system, the first microphone will have the lowest latency, the second microphone will have the second lowest latency, the third microphone will have the third lowest latency, and the fourth microphone will have the highest latency associated with receiving and/or detecting the one or more calibration sounds.

The differences in the amount of latency between the plurality of microphones can be used to calibrate the plurality of microphones including adjusting the plurality of time differences between receipt of a source sound and receipt of a background sound at each of the plurality of microphones respectively (e.g., factoring in the latency of each microphone from the time differences associated with each respective microphone). For example, the latency associated with each of the plurality of microphones can be subtracted from each of the plurality of time differences respectively.

FIG. 7 depicts a diagram of an example system according to example embodiments of the present disclosure. One or more operations and/or functions in FIG. 7 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 7 can include one or more features of one or more devices and/or systems including, for example, the operations computing system 104, the vehicle 108, or the vehicle computing system 112, which are depicted in FIG. 1.

Various means can be configured to perform the methods and processes described herein. For example, an audio computing system 700 can include one or more data accessing units 702, one or more timing units 704, one or more synchronization units 706, one or more amplification units 708, one or more source location units 710, one or more calibration units 712, one or more filtering units 714, one or more control units 716, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, such as random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate an audio computing system) or configured (e.g., an ASIC custom designed and configured to operate an audio computing system) to perform one or more algorithms for performing the operations and functions described herein. For example, the means (e.g., the one or more data accessing units 702) can be configured to access (e.g., receive, retrieve, and/or obtain) sound data. The sound data can be associated with one or more sounds that can include source sounds and/or background sounds received by each of a plurality of microphones.

The means (e.g., the one or more timing units 704) can be configured to determine, based at least in part on the sound data, a plurality of time differences. Each of the plurality of time differences can include a time difference between receipt of a source sound and/or receipt of a background sound at each of the plurality of microphones respectively.

In some embodiments, the one or more timing units 704 can be configured to determine a sound type of the amplified source sound based at least in part on one or more patterns of sound waves including an amplitude and frequency associated with the amplified source sound.

In some embodiments, the one or more timing units 704 can be configured to determine the plurality of time intervals at which one or more patterns of sound waves associated with the source sounds and the background sounds are received at each of the plurality of microphones respectively.

The means (e.g., the one or more synchronization units 706) can be configured to synchronize a set of the source sounds based at least in part on the plurality of time differences.

The means (e.g., the one or more amplification units 708) can be configured to generate an amplified source sound based at least in part on a combination of the set of the synchronized source sounds.

In some embodiments, the one or more amplification units 708 can be configured to generate the amplified source sound based at least in part on the set of the source sounds received by a set of the plurality of microphones including a first microphone of the plurality of microphones at which the amplitude of the set of the source sounds is greatest and at least one microphone adjacent to the first microphone.

The means (e.g., the one or more source location units 710) can be configured to determine a source location of the source sounds based at least in part on the amplified source sound.

In some embodiments, the one or more source location units 710 can be configured to determine a distance from the autonomous vehicle to the source sounds based at least in part on an amplitude of the amplified source sound.

In some embodiments, the one or more source location units 710 can be configured to determine the source location of the source sounds over a plurality of time intervals.

In some embodiments, the one or more source location units 710 can be configured to determine, based at least in part on one or more changes in an amplitude or frequency of the source sounds over the plurality of time intervals, whether the source location is moving towards the autonomous vehicle.

In some embodiments, the one or more source location units 710 can be configured to determine, based at least in part on temperature gradient data, a temperature gradient of an environment around the autonomous vehicle; and determine the source location based at least in part on the temperature gradient.

The means (e.g., the one or more calibration units 712) can be configured to transmit one or more calibration sounds that can be detected and/or received by the plurality of microphones. Further, the one or more calibration units 712 can be configured to determine a plurality of times at which the one or more calibration sounds are received by each of the plurality of microphones. The one or more calibration units 712 can also be configured to calibrate the plurality of microphones based at least in part on one or more differences in the plurality of times at which the plurality of microphones received the one or more calibration sounds.

The means (e.g., the one or more filtering units 714) can be configured to filter the background sounds based at least in part on the plurality of time differences. The filtering can include reducing amplitude of the background sounds.

The means (e.g., the one or more control units 716) can be configured to generate, based at least in part on the source location, one or more control signals. The one or more control signals can change and/or control one or more actions performed by an autonomous vehicle.

Figure 8:
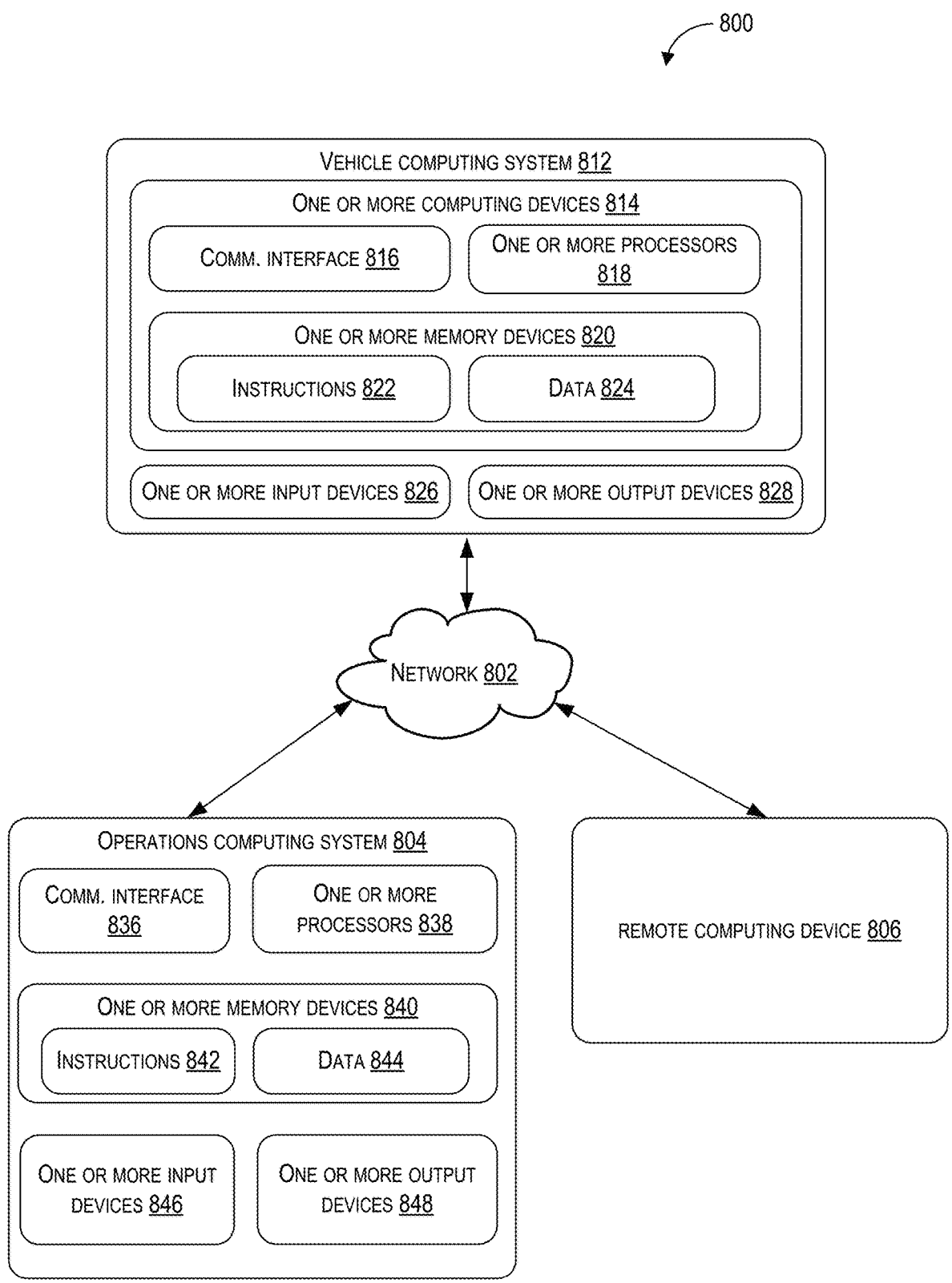
FIG. 8 depicts a diagram of an example system according to example embodiments of the present disclosure.

FIG. 8 depicts a diagram of an example system according to example embodiments of the present disclosure. A system 800 can include a network 802 which can include one or more features of the communications network 102 depicted in FIG. 1; an operations computing system 804 which can include any of the attributes and/or capabilities of the operations computing system 104 depicted in FIG. 1; a remote computing device 806 which can include any of the attributes and/or capabilities of the one or more remote computing devices 106 depicted in FIG. 1; a vehicle computing system 812 which can include any of the attributes and/or capabilities of the vehicle computing system 112 depicted in FIG. 1; one or more computing devices 814; a communication interface 816; one or more processors 818; one or more memory devices 820; computer-readable instructions 822; data 824; one or more input devices 826; one or more output devices 828; one or more computing devices 834; a communication interface 836; one or more processors 838; one or more memory devices 840; computer-readable instructions 842; data 844; one or more input devices 846; and one or more output devices 848.

The vehicle computing system 812 can include the one or more computing devices 814. The one or more computing devices 814 can include one or more processors 818 which can be included on-board a vehicle including the vehicle 108 and one or more memory devices 820 which can be included on-board a vehicle including the vehicle 108. The one or more processors 818 can include any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 818 can include a single processor or a plurality of processors that are operatively and/or selectively connected. The one or more memory devices 820 can include one or more non-transitory computer-readable storage media, including RAM, ROM, EEPROM, EPROM, flash memory devices, magnetic disks, and/or combinations thereof.

The one or more memory devices 820 can store data or information that can be accessed by the one or more processors 818. For instance, the one or more memory devices 820 which can be included on-board a vehicle including the vehicle 108, can include computer-readable instructions 822 that can store computer-readable instructions that can be executed by the one or more processors 818. The computer-readable instructions 822 can include software written in any programming language that can be implemented in hardware (e.g., computing hardware). Further, the computer-readable instructions 822 can include instructions that can be executed in logically and/or virtually separate threads on the one or more processors 818. The computer-readable instructions 822 can include any set of instructions that when executed by the one or more processors 818 cause the one or more processors 818 to perform operations.

For example, the one or more memory devices 820 which can be included on-board a vehicle (e.g., the vehicle 108) can store instructions, including specialized instructions, that when executed by the one or more processors 818 on-board the vehicle cause the one or more processors 818 to perform operations including any of the operations and functions of the one or more computing devices 814 or for which the one or more computing devices 814 are configured, including the operations described herein including operating an autonomous device which can include an autonomous vehicle.

The one or more memory devices 820 can include the data 824 that can include data that can be retrieved, manipulated, created, and/or stored by the one or more computing devices 814. The data stored in the data 824 can include any of the data described herein, including the sound data and any data associated with operation of an autonomous device which can include an autonomous vehicle. For example, the data 824 can include data associated with an autonomy system of an autonomous vehicle including a perception system, a prediction system, and/or a motion planning system.

The data 824 can be stored in one or more databases. The one or more databases can be split up so that the one or more databases are located in multiple locales on-board a vehicle which can include the vehicle 108. In some implementations, the one or more computing devices 814 can obtain data from one or more memory devices that are remote from a vehicle, including, for example the vehicle 108.

The system 800 can include the network 802 (e.g., a communications network) which can be used to send and/or receive signals (e.g., electronic signals) or data (e.g., data from a computing device) including signals or data exchanged between computing devices including the operations computing system 804, and/or the vehicle computing system 812. The network 802 can include any combination of various wired (e.g., twisted pair cable) and/or wireless communication mechanisms (e.g., cellular, wireless, satellite, microwave, and radio frequency) and/or any desired network topology (or topologies). For example, the communications network 802 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 108.

The one or more computing devices 814 can also include the communication interface 816 used to communicate with one or more other systems which can be included on-board a vehicle including the vehicle 108 (e.g., over the network 802). The communication interface 816 can include any suitable components for interfacing with one or more networks, including for example, transmitters, receivers, ports, controllers, antennas, other hardware and/or software.

The vehicle computing system 812 can also include one or more input devices 826 and/or one or more output devices 828. The one or more input devices 826 and/or the one or more output devices 828 can be included and/or otherwise associated with a human-machine interface system. The one or more input devices 826 can include, for example, hardware for receiving information from a user, including a touch screen, touch pad, mouse, data entry keys, speakers, and/or a microphone that can be configured to detect and/or receive sounds in an environment and/or to be suitable for voice recognition. For example, the vehicle computing system 812 can include and/or be associated with the one or more input devices 826 including a plurality of microphones that are configured to detect and/or receive one or more sounds including source sounds and/or background sounds. The plurality of microphones in the one or more input devices 826 can include any of the attributes and/or capabilities of the plurality of microphones 110 that are depicted in FIG. 1.

The one or more output devices 828 can include one or more display devices (e.g., organic light emitting diode (OLED) display, liquid crystal display (LCD), microLED display, or CRT) and/or one or more audio output devices (e.g., loudspeakers). The display devices and/or the audio output devices can be used to facilitate communication with a user. For example, a human operator (e.g., associated with a service provider) can communicate with a current user of a vehicle including the vehicle 108 via at least one of the display devices (e.g., a touch sensitive display device) and/or the audio output devices. Further, the one or more output devices 828 can include one or more audio output devices (e.g., loudspeakers) that can be configured to produce and/or transmit sounds (e.g., calibration sounds) and calibrate microphones including any microphone of a plurality of microphones included in the one or more input devices 826.

The operations computing system 804 can include the one or more computing devices 834. The one or more computing devices 834 can include the communication interface 836, the one or more processors 838, and the one or more memory devices 840. The one or more computing devices 834 can include any of the attributes and/or capabilities of the one or more computing devices 814. The one or more memory devices 840 can store the instructions 842 and/or the data 844 which can include any of the attributes and/or capabilities of the instructions 822 and data 824 respectively.

For example, the one or more memory devices 840 can store instructions, including specialized instructions, that when executed by the one or more processors 838 on-board the vehicle cause the one or more processors 838 to perform operations including any of the operations and functions of the one or more computing devices 834 or for which the one or more computing devices 834 are configured, including the operations described herein including obtaining data (e.g., sound data), determining time differences, synchronizing sounds, generating an amplified sound source, determining a source location of source sounds, and generating control signals that can be used to control devices and/or systems including an autonomous vehicle.

The one or more memory devices 840 can include the data 844 that can store data that can be retrieved, manipulated, created, and/or stored by the one or more computing devices 834. The data stored in the data 844 can include any of the data described herein including the sound data associated with one or more sounds.

Furthermore, the operations computing system 804 can include the one or more input devices 846 and/or the one or more output devices 848, which can include any of the attributes and/or capabilities of the one or more input devices 826 and/or the one or more output devices 828.

The remote computing device 806 can include any of the attributes and/or capabilities of the operations computing system 804 and/or the vehicle computing system 812. For example, the remote computing device can include a communications interface, one or more processors, one or more memory devices, one or more input devices, and/or one or more output devices. Further, the remote computing device 806 can include one or more devices including: a telephone (e.g., a smart phone), a tablet, a laptop computer, a computerized watch (e.g., a smart watch), computerized eyewear (e.g., an augmented reality headset), computerized headwear, and/or other types of computing devices. Furthermore, the remote computing device 806 can communicate (e.g., send and/or receive data and/or signals) with one or more systems and/or devices including the operations computing system 804 and/or the vehicle computing system 812 via the communications network 802. In some embodiments, the operations computing system 804 described herein can also be representative of a user device that can be included in the human machine interface system of a vehicle including the vehicle 108.

The technology discussed herein makes reference to computing devices, databases, software applications, and other computer-based systems, as well as actions taken and information sent to and/or from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Data and/or instructions can be implemented on a single system or distributed across multiple systems. Distributed components can operate sequentially or in parallel.

Furthermore, computing tasks discussed herein as being performed at computing devices remote from the vehicle can instead be performed at the vehicle (e.g., via the vehicle computing system). Such configurations can be implemented without deviating from the scope of the present disclosure. The use of computer-based systems allows for a great variety of different possible configurations, combinations, and/or divisions of tasks and functionality between and/or among components. Computer-implemented tasks and/or operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
    receiving, by a computing system comprising one or more computing devices, sound data associated with one or more sounds, the one or more sounds comprising source sounds and background sounds received by a plurality of microphones;
    determining, by the computing system and based at least in part on the sound data, a plurality of time differences, at least one of the plurality of time differences comprising a time difference between receipt of a source sound and receipt of a background sound at the plurality of microphones respectively, wherein the time differences can be based on one or more comparisons of at least one of a phase of the one or more sounds or an amplitude of the one or more sounds received by the plurality of microphones;
    synchronizing, by the computing system and based at least in part on the plurality of time differences, a set of the source sounds, the synchronized set of source sounds comprising a superposition of sound waves associated with the source sound received by the plurality of microphones respectively;
    generating, by the computing system, an amplified source sound based at least in part on a combination of the synchronized set of the source sounds;
    determining, by the computing system, a source location of the source sounds based at least in part on the amplified source sound; and
    generating, by the computing system and based at least in part on the source location, one or more control signals to change one or more actions performed by an autonomous vehicle.

2. The computer-implemented method of claim 1, wherein the determining, by the computing system and based at least in part on the sound data, a plurality of time differences, at least one of the plurality of time differences comprising a time difference between receipt of a source sound and receipt of a background sound at the plurality of microphones respectively comprises:
    determining, by the computing system, a sound type of the amplified source sound based at least in part on one or more patterns of sound waves including an amplitude and frequency associated with the amplified source sound.

3. The computer-implemented method of claim 2, wherein the sound type of the amplified source sound comprises an ambulance signal sound, a police signal sound, or a fire engine signal sound.

4. The computer-implemented method of claim 1, wherein the determining, by the computing system and based at least in part on the sound data, a plurality of time differences, at least one of the plurality of time differences comprising a time difference between receipt of a source sound and receipt of a background sound at the plurality of microphones respectively comprises:
    determining, by the computing system, a plurality of time intervals at which one or more patterns of sound waves associated with the source sounds and the background sounds are received at the plurality of microphones respectively.

5. The computer-implemented method of claim 1, wherein the generating, by the computing system, an amplified source sound based at least in part on a combination of a synchronized set of the source sounds comprises:
    generating, by the computing system, the amplified source sound based at least in part on the set of the source sounds received by a set of the plurality of microphones comprising a first microphone of the plurality of microphones at which an amplitude of the set of the source sounds is greatest and at least one microphone adjacent to the first microphone.

6. The computer-implemented method of claim 1, wherein the determining, by the computing system, a source location of the source sounds based at least in part on the amplified source sound comprises:
    determining, by the computing system, based at least in part on temperature gradient data, a temperature gradient of an environment around the autonomous vehicle; and
    determining, by the computing system, the source location based at least in part on the temperature gradient.

7. The computer-implemented method of claim 6, wherein the temperature gradient is based at least in part on at least one of a time of day, an air temperature around the autonomous vehicle, an air pressure around the autonomous vehicle, a humidity around the autonomous vehicle, or an intensity of sunlight around the autonomous vehicle.

8. The computer-implemented method of claim 1, wherein the determining, by the computing system, a source location of the source sounds based at least in part on the amplified source sound comprises:
    determining, by the computing system, a distance from the autonomous vehicle to the source sounds based at least in part on an amplitude of the amplified source sound.

9. The computer-implemented method of claim 1, wherein the determining, by the computing system, a source location of the source sounds based at least in part on the amplified source sound comprises:

determining, by the computing system, the source location of the source sounds over a plurality of time intervals; and determining, by the computing system, based at least in part on one or more changes in an amplitude or frequency of the source sounds over the plurality of time intervals, whether the source location is moving towards the autonomous vehicle.

10. The computer-implemented method of claim 1, further comprising:

controlling, by the computing system, one or more vehicle systems of the autonomous vehicle to perform one or more actions associated with the source location; wherein the one or more vehicle systems comprise at least one of one or more sensors, one or more notification systems, or one or more communications systems.

11. The computer-implemented method of claim 10, wherein one or more actions associated with the source location comprise at least one of focusing a set of the one or more sensors towards the source location, generating one or more notifications associated with the source location, or generating one or more communications associated with the source location.

12. The computer-implemented method of claim 1, further comprising:

transmitting, by the computing system, one or more calibration sounds to the plurality of microphones;

determining, by the computing system, a plurality of times at which the one or more calibration sounds are received by each of the plurality of microphones; and calibrating, by the computing system, the plurality of microphones based at least in part on one or more differences in the plurality of times at which the plurality of microphones received the one or more calibration sounds.

13. The computer-implemented method of claim 1, further comprising:

filtering the background sounds based at least in part on the plurality of time differences, wherein filtering comprises reducing amplitude of the background sounds.

14. An autonomous vehicle comprising:

one or more processors;

a plurality of microphones;

a memory comprising one or more tangible non-transitory computer-readable media, the memory storing computer-readable instructions that when executed by the one or more processors cause the one or more processors to perform operations comprising:

receiving sound data associated with one or more sounds, the one or more sounds comprising source sounds and background sounds received by a plurality of microphones;

determining, based at least in part on the sound data, a plurality of time differences, at least one of the plurality of time differences comprising a time difference between receipt of a source sound and receipt of a background sound at the plurality of microphones respectively, wherein the time differences can be based on one or more comparisons of at least one of a phase of the one or more sounds or an amplitude of the one or more sounds received by the plurality of microphones;

synchronizing, based at least in part on the plurality of time differences, a set of the source sounds, the synchronized set of source sounds comprising: a superposition of sound waves associated with the source sound received by the plurality of microphones respectively;

generating an amplified source sound based at least in part on a combination of the synchronized set of the source sounds;

determining a source location of the source sounds based at least in part on the amplified source sound; and generating, based at least in part on the source location, one or more control signals to change one or more actions performed by an autonomous vehicle.

15. The autonomous vehicle of claim 14, wherein the plurality of microphones have a matching polarity.

16. The autonomous vehicle of claim 14, wherein the plurality of microphones are configured to receive the one or more sounds in a three-hundred and sixty degree radius around the autonomous vehicle.

17. The autonomous vehicle of claim 14, wherein at least two of the plurality of microphones are at least one meter apart or arranged in an orientation in which a sound detecting component of at least one of the plurality of microphones is at least perpendicular to a sound detecting component of at least one other microphone of the plurality of microphones.

18. A computing system comprising:

one or more processors;

a memory comprising one or more tangible non-transitory computer-readable media, the memory storing computer-readable instructions that when executed by the one or more processors cause the computing system to perform operations comprising:

receiving sound data associated with one or more sounds comprising source sounds and background sounds received by a plurality of microphones;

determining, based at least in part on the sound data, a plurality of time differences comprising a time difference between receiving a source sound and a background sound at the plurality of microphones respectively, wherein the time differences can be based on one or more comparisons of at least one of a phase of the one or more sounds or an amplitude of the one or more sounds received by the plurality of microphones;

synchronizing, based at least in part on the plurality of time differences, a set of the source sounds, the synchronized set of source sounds comprising a superposition of sound waves associated with the source sound received by the plurality of microphones respectively;

generating an amplified source sound based at least in part on a combination of the set of the source sounds that are synchronized;

responsive to generating the amplified source sound, determining a source location of the source sounds based at least in part on triangulation of the amplified source sound using the plurality of microphones; and generating, based at least in part on the source location, one or more control signals to change one or more actions performed by an autonomous vehicle.

19. The computing system of claim 18, wherein the one or more control signals are an input to a motion planning system of the autonomous vehicle.

20. The computing system of claim 18, wherein the one or more actions comprise modifying a velocity of the autonomous vehicle, modifying an acceleration of the autonomous vehicle, or modifying a travel path of the autonomous vehicle.

\* \* \* \* \*